(12) United States Patent
Lee et al.

(10) Patent No.: US 8,797,407 B2
(45) Date of Patent: Aug. 5, 2014

(54) SECURITY SYSTEM AND METHOD USING MEASUREMENT OF ACOUSTIC FIELD VARIATION

(75) Inventors: Sung Q Lee, Daejeon (KR); Hye Jin Kim, Daejeon (KR); Hong Yeol Lee, Cheongju (KR); Kang Ho Park, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 12/878,414

(22) Filed: Sep. 9, 2010

(65) Prior Publication Data

US 2011/0141283 A1 Jun. 16, 2011

(30) Foreign Application Priority Data

Dec. 14, 2009 (KR) ........................ 10-2009-0123752

(51) Int. Cl.
*H04N 7/18* (2006.01)
*G08B 13/00* (2006.01)
*G01S 15/52* (2006.01)
*G01S 15/88* (2006.01)
*G08B 13/16* (2006.01)
*G08B 13/196* (2006.01)

(52) U.S. Cl.
CPC .............. *G01S 15/526* (2013.01); *G01S 15/88* (2013.01); *G08B 13/1609* (2013.01); *G08B 13/19695* (2013.01)
USPC ........................................... 348/152; 367/93

(58) Field of Classification Search
USPC ........................................... 348/152; 367/93
See application file for complete search history.

(56) References Cited

U.S. PATENT DOCUMENTS

| | | | |
|---|---|---|---|
| 3,898,640 A * | 8/1975 | Hossbach | ........................ 367/93 |
| 4,003,045 A | 1/1977 | Stockdale | |
| 4,772,875 A * | 9/1988 | Maddox et al. | ............... 340/522 |
| 4,853,690 A | 8/1989 | Mayer et al. | |

(Continued)

FOREIGN PATENT DOCUMENTS

| | | |
|---|---|---|
| JP | 08-77466 A | 3/1996 |
| JP | 10-283577 A | 10/1998 |

(Continued)

OTHER PUBLICATIONS

Combining fuzzy vector quantization and neural network classification for robust isolated word speech, pp. 884-886, 1994 IEEE.*

(Continued)

*Primary Examiner* — Christopher S Kelley
*Assistant Examiner* — Asmamaw G Tarko (57) ABSTRACT

A security system and a method of determining whether there is an intrusion are provided. A correlation between sound signals obtained from a sound source generating device and a sound-field variation measuring device is used to measure a acoustic field in a certain space. A difference between an initially set acoustic field and a changed acoustic field is used to determine whether there is an intruding object in a certain space. The security system includes a sound source generating device for generating a sound source; and a sound-field variation measuring device for measuring a acoustic field formed by the sound source, wherein an initially set acoustic field is compared with the measured acoustic field to determine whether there is an intrusion.

16 Claims, 5 Drawing Sheets

(56) References Cited

U.S. PATENT DOCUMENTS

| | | | |
|---|---|---|---|
| 5,396,217 A * | 3/1995 | Proefke et al. | 340/426.26 |
| 5,519,669 A * | 5/1996 | Ross et al. | 367/93 |
| 5,828,626 A * | 10/1998 | Castile et al. | 367/93 |
| 6,415,205 B1 * | 7/2002 | Myron et al. | 700/275 |
| 7,049,960 B2 * | 5/2006 | Waltermann | 340/568.1 |
| 7,535,351 B2 * | 5/2009 | Reymond | 340/541 |
| 7,679,562 B2 * | 3/2010 | Shirakawa | 342/463 |
| 2005/0046584 A1 * | 3/2005 | Breed | 340/825.72 |
| 2008/0018461 A1 * | 1/2008 | Reymond | 340/541 |
| 2010/0033575 A1 * | 2/2010 | Lee et al. | 348/159 |
| 2010/0128123 A1 * | 5/2010 | DiPoala | 348/143 |
| 2012/0087211 A1 * | 4/2012 | Lee et al. | 367/93 |
| 2012/0281138 A1 * | 11/2012 | Choi et al. | 348/460 |

FOREIGN PATENT DOCUMENTS

| | | |
|---|---|---|
| JP | 2007-025910 A | 2/2007 |
| KR | 1020040025148 A | 3/2004 |
| KR | 1020060021803 A | 3/2006 |
| KR | 1020080055340 A | 6/2008 |

OTHER PUBLICATIONS

Fuzzy Learning Scheme for Competitive Neural Networks, Applied Mathematical Sciences, vols. 6, 2012, No. 63, 3133-3144.*

* cited by examiner

SECURITY SYSTEM AND METHOD USING MEASUREMENT OF ACOUSTIC FIELD VARIATION

CROSS-REFERENCE TO RELATED APPLICATION

This application claims the benefit of Korean Patent Application No. 10-2009-0123752, filed Dec. 14, 2009, the disclosure of which is hereby incorporated herein by reference in its entirety.

BACKGROUND

1. Field of the Invention

The present invention relates to a security system and method, and more particularly, to a security system and method that perform security and monitoring using measurement of acoustic field variation.

2. Discussion of Related Art

Security systems have been studied for a long time. There are conventional security systems using a security camera scheme, an infrared ray (IR) scheme, an ultrasonic scheme, and a sound measurement scheme.

There is a conventional ultrasonic scheme in which when there is no intrusion, an ultrasonic wave has a waveform having an upper portion and a lower portion that have the same form, and when there is an intrusion, the waveform is distorted. In this case, the distorted waveform is subjected to digital processing and integral operation. A determination is made as to whether there is an intrusion based on a distortion degree of the waveform. The ultrasonic scheme uses a simple principle and employs a waveform transducer to send an ultrasonic wave, which is returned to the waveform transducer for processing. Thus, the ultrasonic scheme can be easily implemented.

The ultrasonic scheme uses an ultrasonic wave and has low efficiency of generation of the ultrasonic wave to air, causing high power consumption. Where a waveform of a generated ultrasonic wave is initially distorted due to an existing object or condition in a certain space, an intrusion signal is generated irrespective of whether there is an intrusion. Measurement in a wide space is limited due to excellent directivity of the ultrasonic wave, and nonuniform reflection of the ultrasonic wave from ambient objects makes an initialization difficult.

There is another conventional scheme that is similar to the above ultrasonic scheme but is applicable only to the inside of a car. This scheme proposes an ultrasonic-wave intrusion detection and alarm system and method for a car capable of digitally modulating an ultrasonic wave, reducing erroneous detection caused by an echo or external noise, and improving the precision of detection. In an initialization process, an initialization is performed through an accumulated amount of data.

This scheme has overcome the limitation of measurement in wide spaces of the ultrasonic wave by limiting its application to the inside of the car. However, since the scheme uses a similar principle to the foregoing scheme, the scheme has a problem of power inefficiency due to use of the ultrasonic wave and has a disadvantage in that an intrusion signal is erroneously generated irrespective of whether there is an intrusion when a waveform of the ultrasonic wave is initially distorted by an existing object or condition in a certain space.

There is another monitoring scheme for determining whether there is an abnormality in a place to be monitored using environmental sound generated according to an environment of the place. A microphone is disposed at the place to be monitored, a feature extractor extracts a given feature from a sound signal from the microphone, and an abnormality determiner compares the extracted feature with an environmental sound reference model stored in a memory to determine whether there is an abnormality in the place. When it is determined that there is an abnormality, an alarm output unit generates an alarm signal and provides the alarm signal to a monitoring person.

In the conventional schemes, since learning is performed under a silent environment at the time of initialization or at a certain sound state, an operation is very sensitive due to an ambient noise after initializations through learning. Accordingly, a malfunction is highly likely to occur when ambient noise other than an intrusion is generated. Further, since very silent intrusion by a person or object causes no variation of environmental sound, the intrusion is not detected.

SUMMARY OF THE INVENTION

The present invention is directed to a security system and method having high reliability and consuming a small amount of power in a 24-hour operation, which is capable of resolving problems of power consumption caused by a 24-hour operation and a need for an illumination at night in the conventional security camera scheme for security and monitoring, problems of non-operation of security and monitoring upon an intrusion through a blocking cloth or a blocking device in the IR scheme, and problems of low efficiency of delivery of a sound wave to an air layer and difficulty of application of a scan scheme due to high directivity in the ultrasonic scheme.

According to one aspect of the present invention, a security system using measurement of acoustic field variation includes a sound source generating device for generating a sound source; and a sound-field variation measuring device for measuring a acoustic field formed by the sound source inside a certain space, and comparing the measured acoustic field with an initially set acoustic field when the sound source is generated, to determine whether there is an intrusion in the certain space.

The sound-field variation measuring device may include at least one acoustic sensor, and the acoustic field may be obtained by obtaining a sound pressure ratio and a phase difference between the sound source and a measurement position of the acoustic sensor through the acoustic sensor and monitoring a acoustic field between the sound source and a measurement position. The acoustic sensor may be a microphone for measuring a signal in a sound wave area generated from the sound source, and the sound-field variation measuring device may further include a frequency conversion filter for converting a signal measured by the acoustic sensor into a signal in a frequency domain. The comparison of the initially set acoustic field with the measured acoustic field may be performed by comparing transfer functions of the acoustic field to the sound source. The transfer function of the acoustic field may be intermittently or continuously measured in a monitoring state. A fuzzy learning scheme or a neural network learning scheme may be used to set the initial acoustic field. The sound source may include a pink noise, a white noise or a sine wave in a certain frequency band. The sound-field variation measuring device may be synchronized to a sound source from the sound source generating device. The frequency conversion filter may be a filter for Fourier-converting a function in a time domain into a function in a frequency domain. The security system may further include a camera operating when it is determined that there is an intrusion through a comparison of the initially set acoustic field with the measured acoustic field. Here, the monitoring camera may be a visible light monitoring camera or an infrared camera. The camera additionally determines whether there is an intrusion through image signal processing.

According to another aspect of the present invention, a security method using measurement of acoustic field variation includes generating a sound source; measuring a acoustic field formed by the sound source inside a certain space; setting an initial transfer function of the acoustic field to the sound source; intermittently or continuously measuring the acoustic field formed by the sound source to detect a transfer function; and comparing the initial transfer function with the detected transfer function to determine whether there is an intrusion inside the certain space.

BRIEF DESCRIPTION OF THE DRAWINGS

The above and other features of the present invention will be described in reference to certain exemplary embodiments thereof with reference to the attached drawings in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
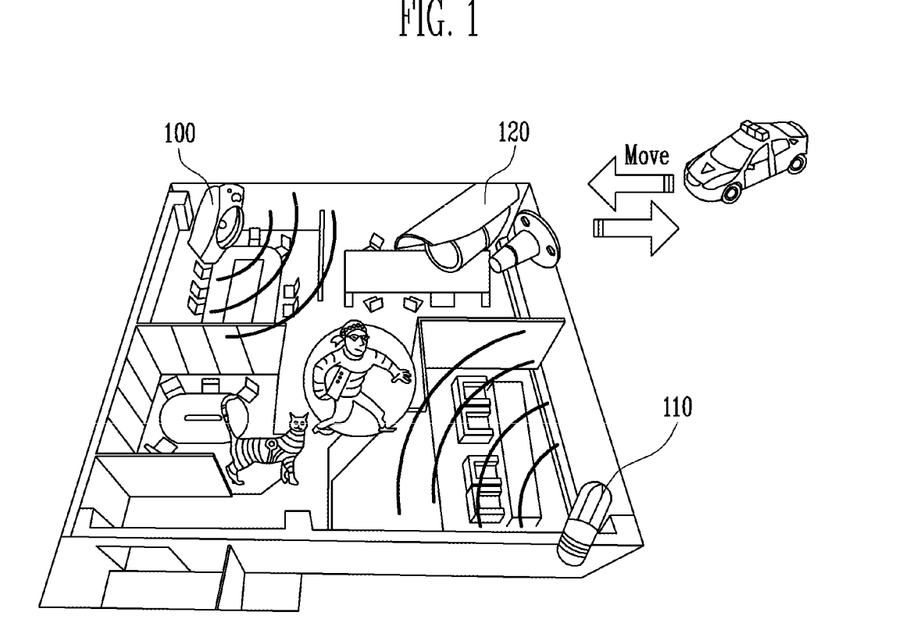
FIG. 1 illustrates a configuration of a security system using measurement of acoustic field variation according to an exemplary embodiment of the present invention.

FIG. 1 illustrates a configuration of a security system using measurement of acoustic field variation according to an exemplary embodiment of the present invention. In particular, an acoustic device and a security camera are employed.

As shown in FIG. 1, the security system includes a sound source generating device 100 and a sound-field variation measuring device 110 to monitor the variation of a acoustic field and monitor an intrusion. Here, the security system may include only the sound-field variation measuring device 110 to perform security and monitoring. The security system may be configured to perform security and monitoring intermittently or continuously for 24 hours using the sound-field variation measuring device 110, and then operate a security camera 120 to record an image of a place or monitor an intrusion through image processing when an abnormality signal is generated.

The security camera 120 may be a general camera or an infrared camera.

The sound-field variation measuring device 110 includes at least one acoustic sensor. For example, the acoustic sensor may be a microphone that measures a signal in a sound wave area generated from the sound source generating device 100. The sound-field variation measuring device 110 may further include a frequency conversion filter for converting the signal measured by the acoustic sensor into a signal in a frequency domain. The acoustic field is obtained by obtaining a sound pressure ratio and a phase difference between the sound source and a measurement position of the acoustic sensor using an acoustic sensor and modeling a acoustic field between the sound source and a measurement position.

The sound-field variation measuring device 110 can operate on low power for 24 hours because of its low power consumption and its monitoring capability in a dark place. Since a monitoring camera needs an illumination and continuous recording or image processing causes severe issues of a recording memory or power, a combination with a system for first monitoring an object can provide high monitoring efficiency.

Figure 2:
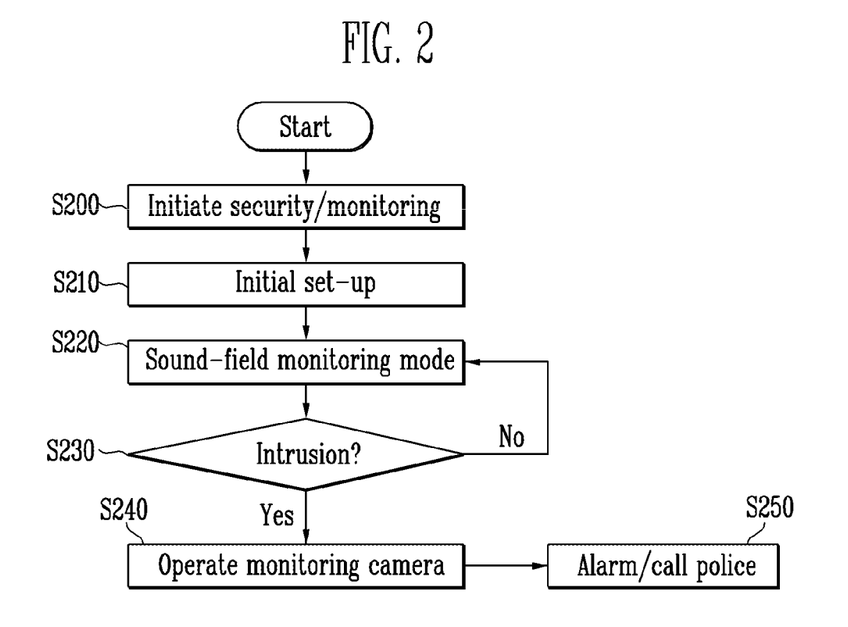
FIG. 2 is a flowchart illustrating a security method using measurement of acoustic field variation according to an exemplary embodiment of the present invention.

FIG. 2 is a flowchart illustrating a security method using measurement of acoustic field variation according to an exemplary embodiment of the present invention.

First, security and monitoring is initiated (S200).

An initialization is then performed (S210). The sound source generating device 100 operates to generate a sound source. In this case, the sound-field variation measuring device 110 may be synchronized to the sound source generating device 100. A acoustic field formed by the sound source is measured to set an initial transfer function. Information on an initial acoustic field size and phase is stored. A fuzzy learning scheme or a neural network learning scheme may be used to set an initial value.

A variation of the acoustic field is then monitored (S220). The sound source generating device 100 is synchronized to the sound-field variation measuring device 110, and the acoustic field formed by the sound source generated from the sound source generating device 100 is measured to detect a transfer function. This monitoring operation may be performed intermittently or continuously.

The initially set transfer function is compared with the detected transfer function to determine whether there is an intrusion (S230).

When there is no intrusion, the variation of the acoustic field is again monitored (S220).

When there is an intrusion, the security camera 120 operates (S240). When the inside is too dark to photograph an object, an illumination may be automatically turned on and recording may be initiated. An obtained image is subjected to signal processing to secondarily confirm the intruding object.

When the intrusion is secondarily confirmed, an alarm is generated and police are called (S250).

Figure 3A:
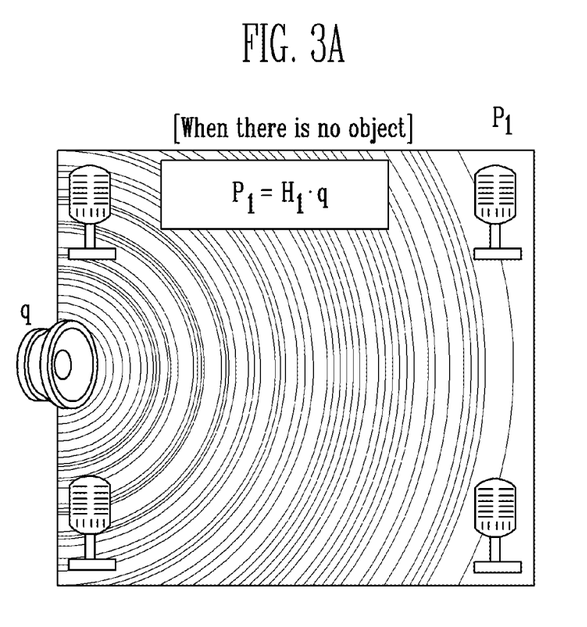
FIGS. 3A and 3B are diagrams for explaining a method of numerically analyzing the variation of a acoustic field according to presence or absence of an object according to the exemplary embodiment of the present invention.
Figure 3B:
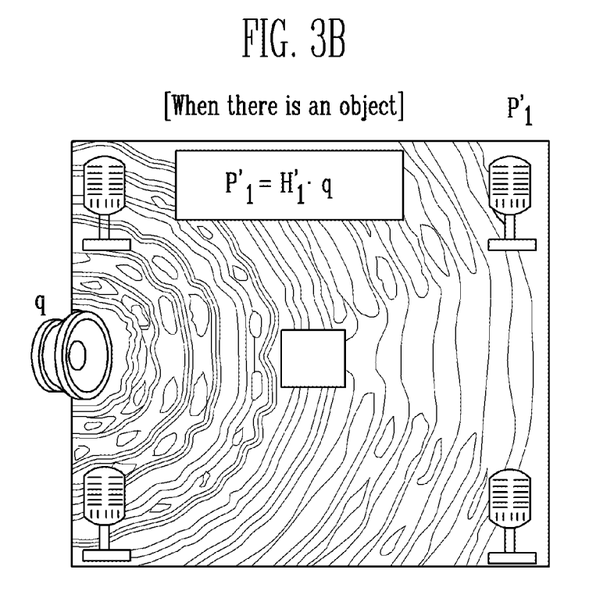

FIGS. 3A and 3B are diagrams for explaining a method of numerically analyzing the variation of a acoustic field according to presence or absence of an object according to the exemplary embodiment of the present invention.

As shown in FIG. 3A, when there is no intruding object inside a certain space, a flow of a acoustic field from a sound source to a microphone has a shape similar to a flow of water. However, as shown in FIG. 3B, when there is an intruding object inside the certain space, the acoustic field varies as a water flow varies. This variation of the acoustic field is measured using at least one acoustic sensor. In a general space, sound pressure at a certain distance r from a monopole sound source may be represented based on a green function that governs the acoustic field, as follows:

$$p(r, t) = i\frac{Q\rho ck}{4\pi r}e^{i(\omega t - kr)}$$

where $Q=4\pi\alpha^2 U_0$ denotes an intensity (size) of the sound source. $\rho$ denotes a density, c denotes the speed of sound, and $k=2*pi/\lambda$ that is a wave number. r denotes a distance between the sound source and the measurement position, w denotes a frequency, and a denotes a diameter of the sound source.

A sound pressure ratio and a phase difference between the sound source and the measurement position may be obtained using at least one acoustic sensor to predict and model a acoustic field between the sound source and the measurement position. Use of several acoustic sensors makes it possible to more accurately predict the acoustic field.

Here, information on the sound pressure ratio and the phase difference increases according to a frequency. Accordingly, it is advantageous to generate a variety of signals from the sound source. Thus, when a signal corresponding to a pink or white noise or a sine wave in a certain frequency band is being generated in the sound source generating device, a transfer function of a measured signal to the sound source is obtained using an acoustic sensor such as a microphone. The transfer function may be obtained in a time domain or may be obtained in a frequency domain using a value in a frequency domain from the frequency conversion filter of the sound-field variation measuring device 110.

The transfer function may be divided into relative size ratio and phase difference components, which are used to measure a changed amount. In this case, the variation of the acoustic field varies with a frequency component and a minimum recognition size of an intruding object is determined. As a lower frequency is used, high diffraction occurs. Accordingly, a measured value of the acoustic field variation resulting from object overlap increases. However, there is a disadvantage in that the minimum recognition size of an object, i.e., a resolution, becomes small. As a higher frequency is used, low diffraction occurs and an overlapping phenomenon decreases, but the minimum recognition size, i.e., the resolution, is advantageously enhanced.

In an exemplary embodiment of the present invention, for a tradeoff between the advantage and disadvantage, a signal including a pink or white noise having several wavelengths or a sine wave in a certain frequency band is generated instead of using one wavelength.

Alternatively, a signal in a sound wave area of an audible frequency band (20 to 20,000 Hz) having high delivery efficiency in a general space may be used as the sound source of the present invention. In this case, it is possible to minimize power consumption in the sound source generating device or the sound-field variation measuring device.

In particular, when an object moves inside a certain space or intrudes into the space, it is possible to determine whether there is an intrusion based on the variation of the acoustic field caused by the intruding object even when there is no noise generated from the intruding object.

It is also possible to prevent a malfunction caused by an ambient noise source by synchronizing the sound source with the acoustic sensor upon measurement.

Figure 4:
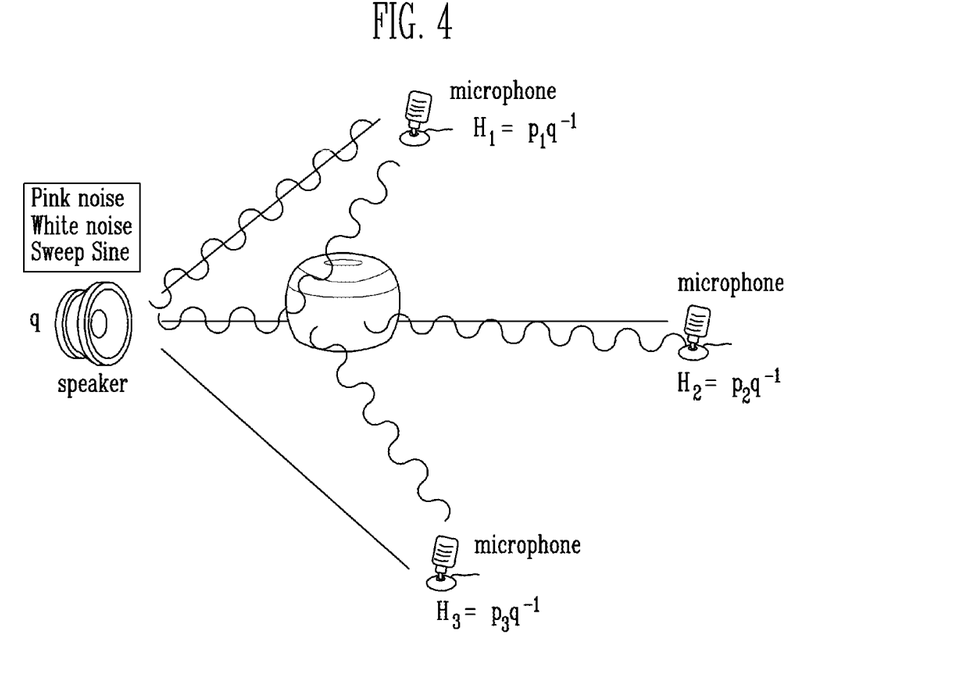
FIG. 4 illustrates the type of signals of a sound source generated by a sound source generating device and a method of measuring a acoustic field in each sound-field variation sensor according to an exemplary embodiment of the present invention.

FIG. 4 illustrates the type of signals of a sound source generated by the sound source generating device and a method of measuring a acoustic field in each sensor according to an exemplary embodiment of the present invention. In FIG. 4, the variation of a size difference and a phase difference of a sound wave among sound-field variation properties according to presence or absence of an intruding object at a scanning frequency is shown.

The sound source generating device generates a signal including a pink or white noise or a sine wave in a certain frequency band, and the acoustic sensor at each position receives the signal to obtain a transfer function using an equation in FIG. 4.

Figure 5A:
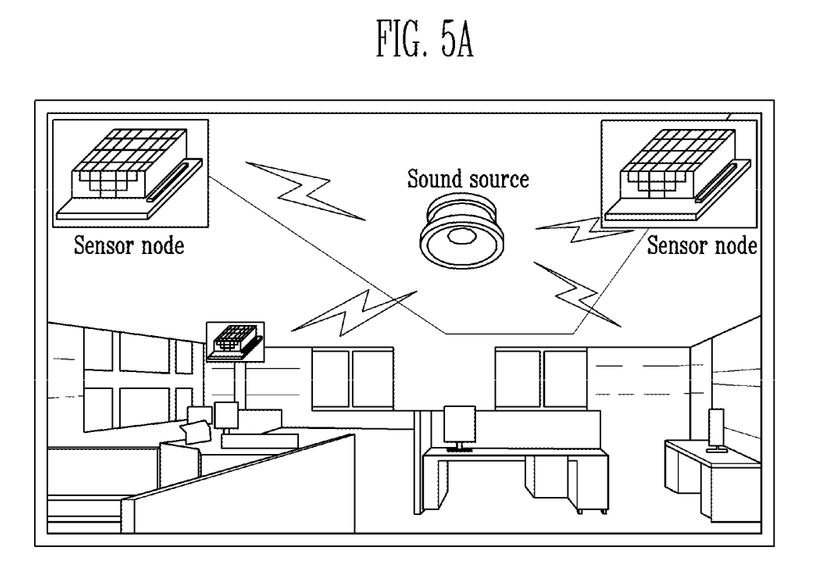
FIGS. 5A and 5B illustrate a configuration of a security system configured of a ubiquitous sensor network (USN) according to an exemplary embodiment of the present invention.
Figure 5B:
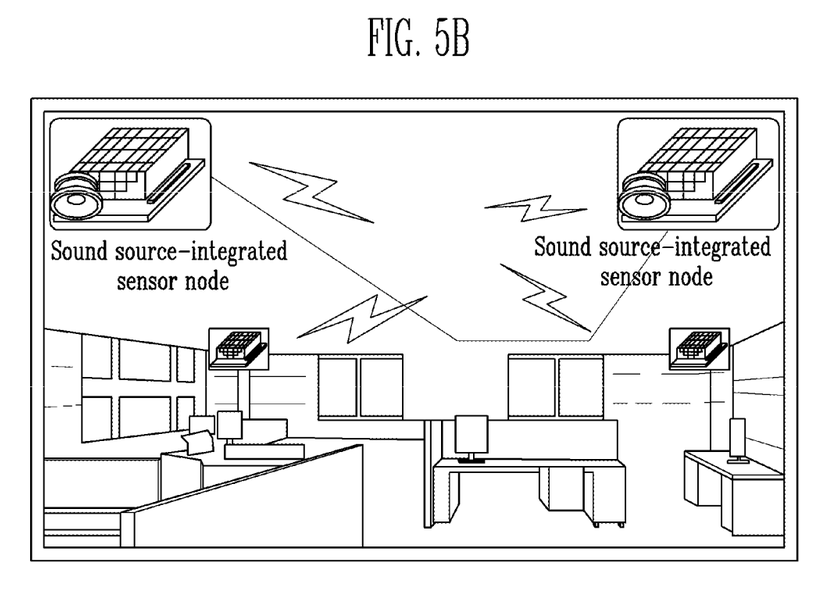

FIGS. 5A and 5B illustrate a configuration of a security system configured of a ubiquitous sensor network (USN) according to an exemplary embodiment of the present invention.

As shown in FIG. 5A, a plurality of sensor nodes each having a sound source generating device and a sound source sensor are disposed. Or, as shown in FIG. 5B, a plurality of sound source-integrated sensor nodes are disposed.

According to the present invention as described above, the intrusion can be monitored by measuring the acoustic field variation. Thus, it is possible to resolve problems of power consumption caused by a 24-hour operation of a security camera and a need for an illumination at night in a conventional security system using a security camera. It is also possible to resolve problems of non-operation of the security system upon an intrusion through a blocking cloth or a blocking device using an IR scheme. It is also possible to resolve problems associated with power due to low efficiency of delivery of a sound wave to an air layer and difficulty of application of a scan scheme due to high directivity in a security system using an ultrasonic wave.

The security system according to the present invention can resolve problems of power consumption caused by an 24-hour operation and a need for an illumination at night, problems of non-operation of security/monitoring upon an intrusion through a blocking cloth or a blocking device, and problems associated with power due to low efficiency of delivery of a sound wave to an air layer and difficulty of application of a scan scheme due to high directivity in the ultrasonic scheme. It is possible to achieve high likelihood of practical implementation because low power consumption in a 24-hour operation is realized according to a sound-field variation measurement principle. It is also possible to determine whether there is an intrusion without an illumination, and to monitor an object movement inside a certain space or an object intrusion into the space without error even when there is an IR blocking device. Even when an intruding object does not generate a noise, a determination can be made as to whether there is an intrusion based on the acoustic field variation caused by the intruding object, thereby achieving high reliability.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A security system using measurement of acoustic field variation, the security system comprising:
   a sound source configured to generate an acoustic field; and
   a plurality of sound-field variation measuring devices configured to measure an acoustic field formed by the sound source inside a certain space including at least four corners, and to compare the measured acoustic field with an initially set acoustic field to determine whether there is an intrusion in the certain space, wherein the plurality of sound-field variation measuring devices include at least four sound-field variation measuring devices respectively disposed in the four corners of the certain space, and wherein the sound source is configured to generate a pink noise or a white noise in a certain frequency band.

2. The security system of claim 1, wherein each sound-field variation measuring device comprises at least one acoustic sensor, and the acoustic field is obtained by obtaining sound pressure ratios and phase differences between the sound source and each acoustic sensor through each acoustic sensor.

3. The security system of claim 2, wherein the at least one acoustic sensor is a microphone for measuring a signal in a sound wave area generated from the sound source, and the each sound-field variation measuring device further comprises a frequency conversion filter for converting a signal measured by the at least one acoustic sensor into a signal in a frequency domain.

4. The security system of claim 1, wherein the comparison of the initially set acoustic field with the measured acoustic field is performed by comparing a transfer function of the initially set acoustic field with a transfer function of the measured acoustic field.

5. The security system of claim 4, wherein the transfer function of the measured acoustic field is intermittently or continuously measured in a monitoring state.

6. The security system of claim 1, wherein a fuzzy learning scheme or a neural network learning scheme is used to set the initial acoustic field.

7. The security system of claim 1, wherein the plurality of sound-field variation measuring devices are synchronized to a sound from the sound source.

8. The security system of claim 1, further comprising a camera operating when it is determined that there is an intrusion through a comparison of the initially set acoustic field with the measured acoustic field.

9. The security system of claim 8, wherein the camera is a visible light camera or an infrared camera.

10. The security system of claim 9, wherein the camera additionally determines whether there is an intrusion through image signal processing.

11. The security system of claim 1, wherein the certain space is an office space.

12. The security system of claim 1, wherein the intrusion that the plurality of sound-field variation measuring devices are configured to determine is an intrusion by a human sized object.

13. The security system of claim 1, wherein at least a portion of the acoustic field is in the audible frequency range.

14. A security method using measurement of acoustic field variation, the security method comprising;

providing a sound source;

measuring an initial acoustic field formed by the sound source inside a certain space which includes at least four corners;

providing one sound-field variation measuring device in each of the four corners;

setting an initial transfer function for the initial acoustic field;

measuring a second acoustic field formed by the sound source after the initial acoustic field;

calculating a second transfer function of the second acoustic field; and comparing the initial transfer function with the second transfer function to determine whether there is an intrusion inside the certain space, wherein the sound source is configured to generate a pink noise or a white noise in a certain frequency band.

15. The security method of claim 14, further comprising operating a monitoring camera when it is determined that there is an intrusion.

16. The security method of claim 15, wherein operating the monitoring camera comprises additionally determining whether there is an intrusion through image signal processing.

* * * * *